(12) United States Patent
Perry

(10) Patent No.: US 8,864,455 B2
(45) Date of Patent: Oct. 21, 2014

(54) IMPULSE WIND MACHINE

(75) Inventor: Loyd Dale Perry, Idaho Falls, ID (US)

(73) Assignee: Loyd Dale Perry, Idaho Falls, ID (US)

( * ) Notice: Subject to any disclaimer, the term of this patent is extended or adjusted under 35 U.S.C. 154(b) by 523 days.

(21) Appl. No.: 13/317,543

(22) Filed: Oct. 21, 2011

(65) Prior Publication Data

US 2013/0101398 A1    Apr. 25, 2013

(51) Int. Cl.
*F03D 3/04* (2006.01)

(52) U.S. Cl.
CPC ......... *F03D 3/0427* (2013.01); *F05B 2240/241* (2013.01); *Y02E 10/74* (2013.01)
USPC .......................................... 415/184; 415/205

(58) Field of Classification Search
CPC ..... F03D 3/002; F03D 3/0409; F03D 3/0427; F03D 3/04; F03D 3/0445; F03D 3/0454; F03D 3/0463
USPC .......... 415/184, 205, 2.1, 4.1, 95, 101, 208.3, 415/208.2, 183, 159, 186; 416/184
See application file for complete search history.

(56) References Cited

U.S. PATENT DOCUMENTS

| | | | | |
|---|---|---|---|---|
| 15,384 | A * | 7/1856 | Munroe | 415/184 |
| 204,481 | A * | 6/1878 | Cleland | 415/33 |
| 648,442 | A | 5/1900 | Scott | |
| 705,922 | A * | 7/1902 | Gran | 415/151 |
| 757,800 | A | 4/1904 | Williams | |
| 1,234,405 | A * | 7/1917 | Solomon | 415/4.2 |
| 1,345,022 | A | 6/1920 | Oliver | |
| 1,599,944 | A * | 9/1926 | Baumgart | 415/46 |
| 1,646,723 | A | 10/1927 | Bonetto | |
| 1,783,669 | A | 12/1930 | Oliver | |
| 3,883,750 | A | 5/1975 | Uzzell, Jr. | |
| 3,944,840 | A * | 3/1976 | Troll | 290/55 |
| 3,988,072 | A | 10/1976 | Sellman | |
| 4,084,918 | A | 4/1978 | Pavlecka | |
| 4,115,028 | A * | 9/1978 | Hintze | 415/151 |
| 4,127,356 | A * | 11/1978 | Murphy | 415/4.1 |
| 4,398,096 | A * | 8/1983 | Faurholtz | 290/55 |
| 4,616,974 | A * | 10/1986 | Andruszkiw et al. | 415/4.3 |
| 5,009,569 | A | 4/1991 | Hector, Sr. | |
| 6,239,507 | B1 * | 5/2001 | Douthit | 290/55 |
| 6,246,126 | B1 | 6/2001 | Van Der Veken | |
| 6,409,467 | B1 | 6/2002 | Gutterman | |
| 6,638,005 | B2 | 10/2003 | Holter | |
| 6,655,907 | B2 | 12/2003 | Brock | |
| 6,755,608 | B2 * | 6/2004 | Boughton | 415/4.5 |
| 7,084,520 | B2 * | 8/2006 | Zambrano et al. | 290/44 |

(Continued)

FOREIGN PATENT DOCUMENTS

FR    2587763 A1 * 3/1987 ............... F03D 3/04

*Primary Examiner* — Richard Edgar

(57) ABSTRACT

An impulse wind machine comprises the following:
A funnel configured to capture air from the wind.
A turbine housing configured to direct the air to the center (eye) of the housing where the air passes through directional vanes.
A rotor configured to rotate within the eye of the turbine housing and configured with impulse blades along the longitudinal periphery. Air from the directional vanes impinges the impulse blades to cause rotor rotation.
An exhaust deflector configured inside the cavity of the rotor to deflect exhaust air from the impulse blades axially out the ends of the rotor.
Spokes on the rotor configured to provide a fan action during rotor rotation aiding removal of the exhaust air.
A generator and a gearbox driven by a shaft connected to the rotor for generating electrical power.

14 Claims, 5 Drawing Sheets

(56) References Cited

U.S. PATENT DOCUMENTS

| | | |
|---|---|---|
| 7,215,037 B2 | 5/2007 | Scalzi |
| 7,276,809 B2 * | 10/2007 | Zambrano et al. ............ 290/55 |
| 7,315,093 B2 * | 1/2008 | Graham, Sr. ................. 290/55 |
| 7,368,828 B1 | 5/2008 | Calhoon |
| 2004/0113431 A1 * | 6/2004 | Huang ........................... 290/55 |
| 2007/0222225 A1 * | 9/2007 | Mahoney ...................... 290/55 |

* cited by examiner

IMPULSE WIND MACHINE

BACKGROUND

The high output wind generator turbines in current operation today require tall expensive structures to access the areas of highest wind conditions and to provide the space needed for the large turbine blades to operate. Also many miles of power transmission lines, roads, and support structures for the transmission lines are required to be built and maintained to connect to the nation's power grid for utilization of the electrical power. Of the total sweep area of these giant turbine propellers, most of the wind (air) passes through without contacting the turbine blades thus with low efficiency. The above results in a very high cost to power ratio. The impulse wind machine can be built close to the ground less than 30 feet high thus minimizing structural requirements compared to that required for the expensive towers. The impulse wind machines cant be built in urban and rural areas with reasonable access to power transmission lines thus minimizing the cost of power transmission. The impulse wind machine will utilize the available wind energy with greater efficiency than do the propeller machines.

SUMMARY OF THE INVENTION

According to an embodiment of the present invention, a wind collection funnel with a progressively decreasing cross section is configured with an intake at the large opening of the funnel to capture air from the oncoming wind. The air increases in velocity as it flows from the intake to an exit at the funnel's small opening. The funnel is configured stationary for this embodiment to receive the prevailing wind but may be configured to rotate to receive wind from any direction. The funnel exit is coupled to a turbine housing inlet.

The turbine housing is configured with an inlet to receive air from the funnel exit and to direct the air in an inward spiral path to an outlet at a center cylindrical opening of the turbine housing. The center cylindrical opening is referred to as the eye of the turbine housing where the air passes through a plurality of directional vanes configured along the longitudinal periphery of the eye of the turbine housing.

a cylindrical rotor comprises a plurality of impulse blades configured longitudinally along the cylindrical perimeter of the rotor. The impulse blades are connected to a rim at each end of the rotor. The rotor is configured to rotate on a shaft within the eye of the turbine housing. The air, after passing through the directional vanes, will impinge the impulse blades and cause the rotor to rotate.

An exhaust deflector is configured inside the cavity of the rotor cylinder to receive the air that passes through the impulse blades and to deflect the air axially toward the ends of the rotor cylinder as exhaust air Each rim of the rotor is connected to each a shaft mounted hub with spokes. The spokes are configured with a substantially flat surface oriented at an angle to the plane of the rim so as to produce a fan action during rotor rotation to aid removal of the exhaust air from the rotor cavity.

The shaft is supported by bearings and bearing supports and is coupled to a generator through a gearbox for generating electricity.

BRIEF DESCRIPTION OF THE DRAWINGS

The drawings are not to scale.

DETAILED DESCRIPTION OF THE PREFERRED EMBODIMENT

All examples given are for clarification only, and are not intended to limit the scope of the invention.

Figure 3:
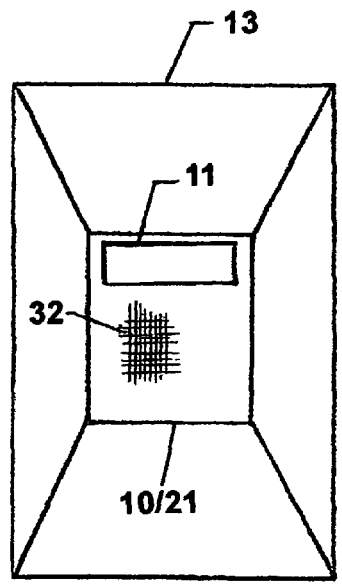
FIGS. 1, 2, and 3 show top, side, and end views consecutively of an impulse wind machine according to a preferred embodiment.
Figure 2:
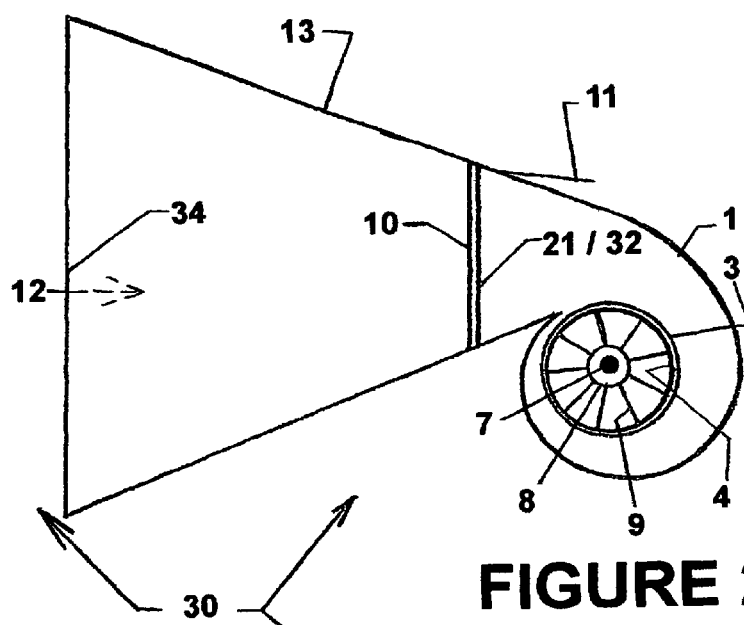
Figure 1:
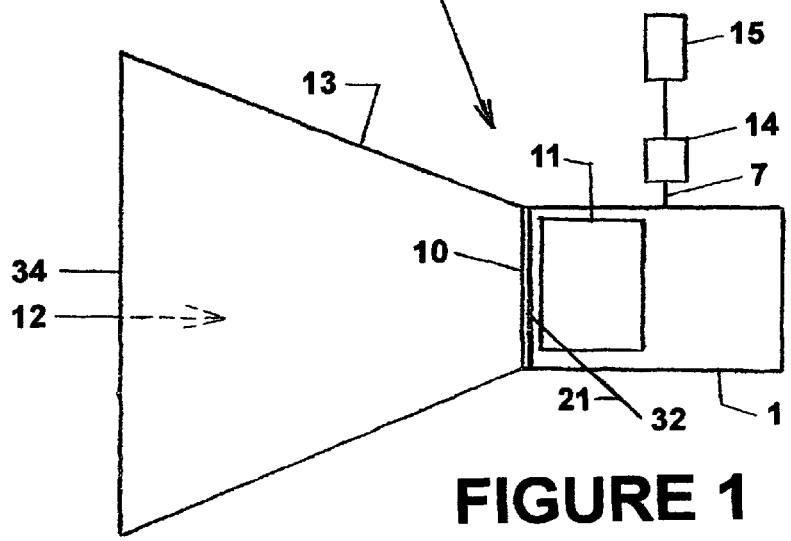

Referring to FIGS. 1, 2, and 3, the impulse wind machine 30 is a combination of components for the purpose of converting wind energy into rotational mechanical energy which may be used to supply any rotational mechanical energy needs. The preferred use of the energy is to supply power to a public utility power grid. The components of this invention may be made of any supportive material known in the art including but not limited to plastic, metal, or wood but preferably from aluminum or steel.

A wind collection funnel 13 is configured with an intake 34 to capture air 12 from the oncoming wind. The funnel 13 has a decreasing cross section in the direction of the air 12 flow with an exit 10 at the small end of the funnel 13. The air 12 flowing through the funnel's 13 decreasing cross section increases in velocity from the intake 34 to the exit 10.

The funnel 13 may be cone shaped or of any shape. For this embodiment the decreasing cross section is accomplished by connecting four trapezoid shaped panels together to form the funnel 13. The funnel 13 may also be any size and may be located to take advantage of building structures or other objects to direct the wind to the intake 34 of the funnel 13. The entire machine 30 or just the funnel 13 may be configured to rotate to track the direction of the oncoming wind. The funnel's 13 exit 10 is coupled to a turbine housing 1 inlet 21 where the funnel's 13 captured air 12 is directed through a protective screen 32 at the turbine housing 1 inlet 21. The protective screen 32 substantially prevents foreign objects from entering to impede operation of the machine 30. Protective screening may be installed at the funnel's 13 intake 34. Foreign objects captured by the protective screen 32 will be removed by gravity as the lower section of the funnel 13 will be sloped downward. FIG. 1 shows a top view of the impulse wind machine 30 comprising a shaft 7 connected to an adjustable speed reduction gearbox 14 which is coupled to a generator 15. The generator 15 and the gearbox 14 are market available equipment.

Referring to FIGS. 1, 2, 3, and 4, the turbine housing 1 is configured with at least one wind diversion door 11 that is spring loaded to stay closed during normal wind conditions. The door 11 is configured to open during storm conditions to divert excessive wind pressure away from and to protect the machine 30 from damage. The door 11 can be configured to open when the current output from the generator 15 exceeds a preset value. One or more diversion doors may be configured onto the funnel 13 or onto the turbine housing 1.

Figure 4:
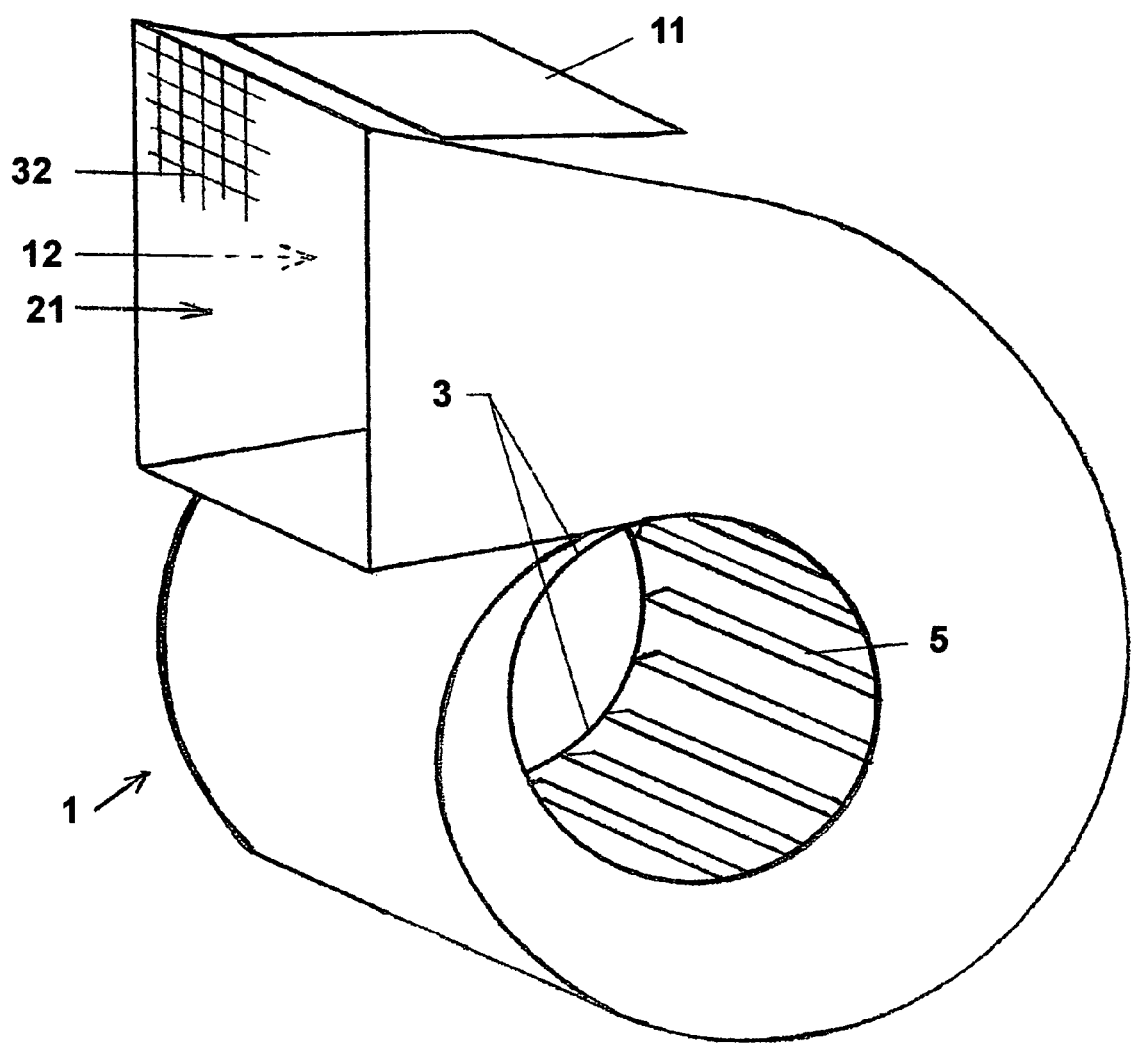
FIG. 4 shows a perspective view of the turbine housing according to a preferred embodiment.
Figure 7:
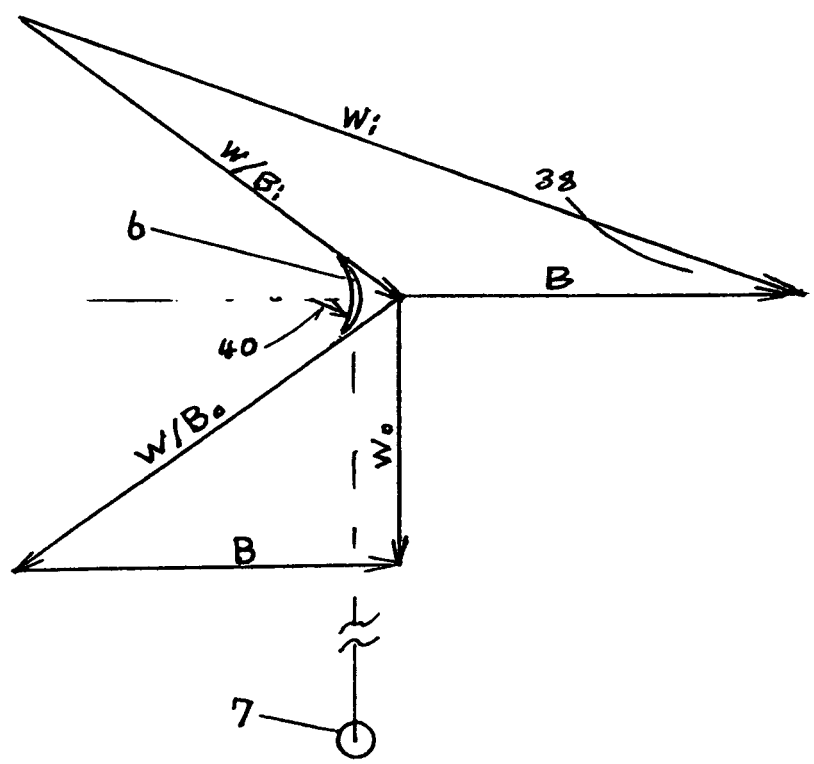
FIG. 7 shows a cross section view of a turbine rotor impulse blade with a vector diagram depicting the desired blade velocity based on the existing air velocity driving the blade according to a preferred embodiment.

Referring now to FIGS. 1, 4, and 7, the turbine housing 1 is configured with an inlet 21 to receive the air 12 from the funnel's 13 exit 10, through the protective screen 32, and is configured to direct the air 12 in an inward spiral path to an outlet at a center cylindrical opening of the turbine housing 1. The outlet at the center cylindrical opening of the turbine housing 1 is henceforth referred to as the eye 3 of the turbine housing 1 where the air 12 passes through a plurality of directional vanes 5 configured along the longitudinal periphery of the eye 3. Each directional vane 5 is fixed at an angle 38 of approximately 5 to 45 degrees with respect to a corresponding tangent on the circle of the eye 3. The angle 38 of the directional vanes 5 determines the angle 38 at which the air 12 velocity $W_i$ enters the impulse blades 6. See FIG. 7. The air 12 velocity out of the directional vane 5 is identical to the air 12 velocity $W_i$ entering the impulse blade 6.

Figure 5:
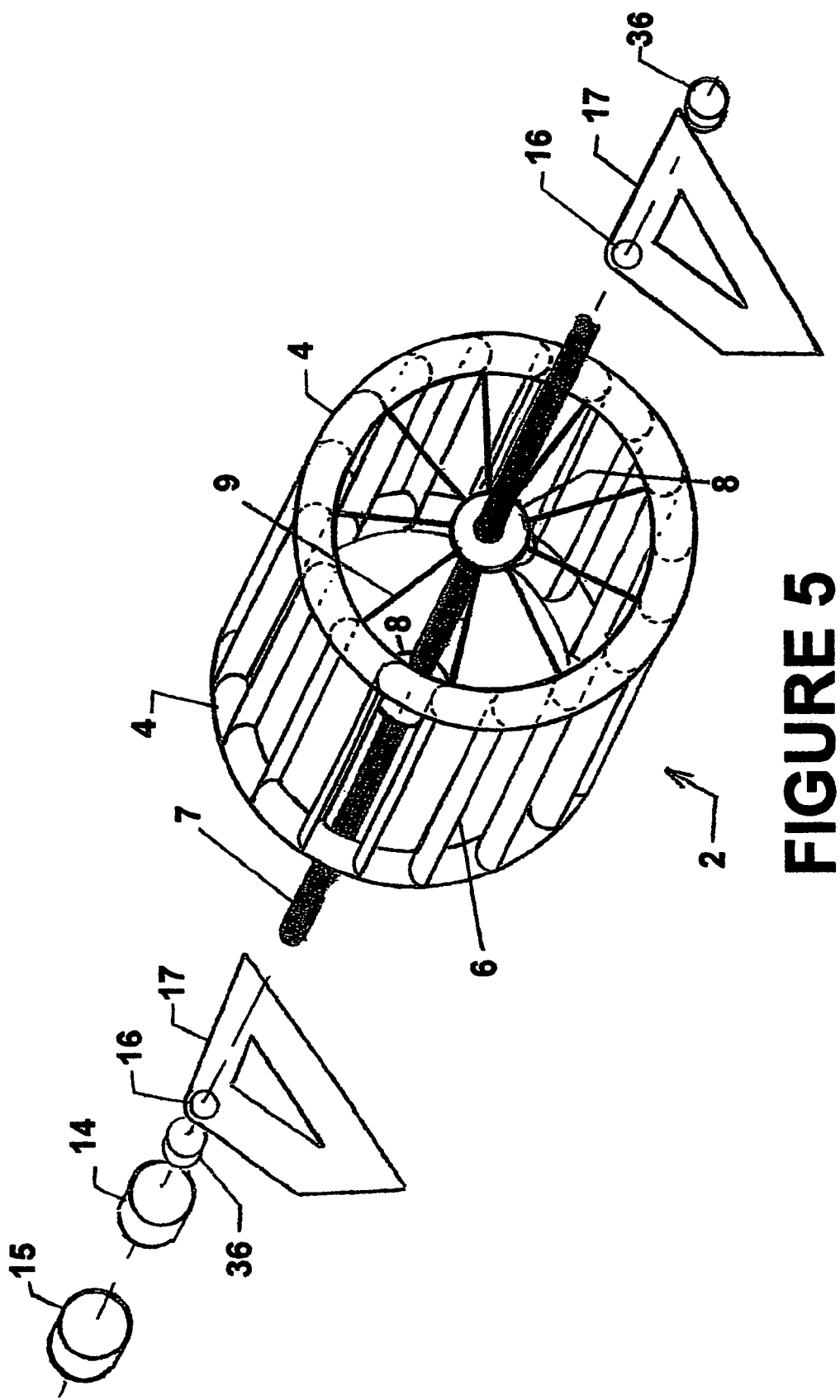
FIG. 5 shows a perspective view of the turbine rotor according to a preferred embodiment.

Referring now to FIGS. 4, 5 and 7, a cylindrical rotor 2 is a rigid component comprising the shaft 7, at least two hubs 8, a plurality of spokes 9, at least two rims 4, and a plurality of impulse blades 6. The impulse blades 6 are configured longitudinally, defining the cylindrical perimeter of the rotor 2 and are attached to two rims 4, one at each end of the rotor 2. Each rim 4 is connected to its corresponding hub 8 by a plurality of spokes 9. The hubs 8, are mounted to the shaft 7. The rotor 2 is configured to rotate within the eye 3 of the turbine housing 1 where the air 12, after passing through the directional vanes 5, and impinging the impulse blades 6, causes the rotor 2 to rotate. The air 12 exits the impulse blades 6 at a lower velocity $W_o$ and is herein referred to as the exhaust air 12.

Figure 6A:
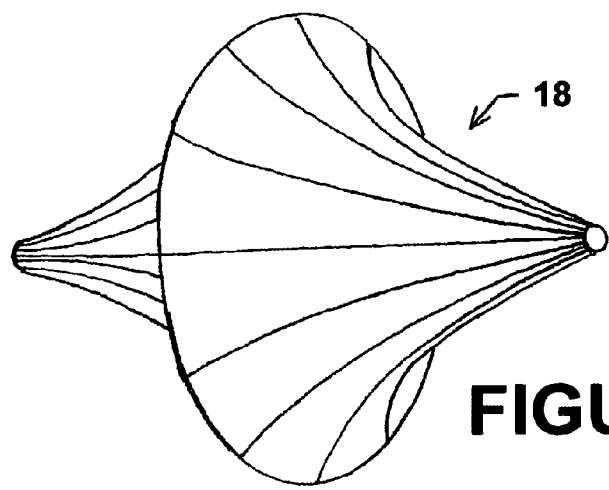
FIG. 6A shows a perspective view of the exhaust air deflector.
Figure 6:
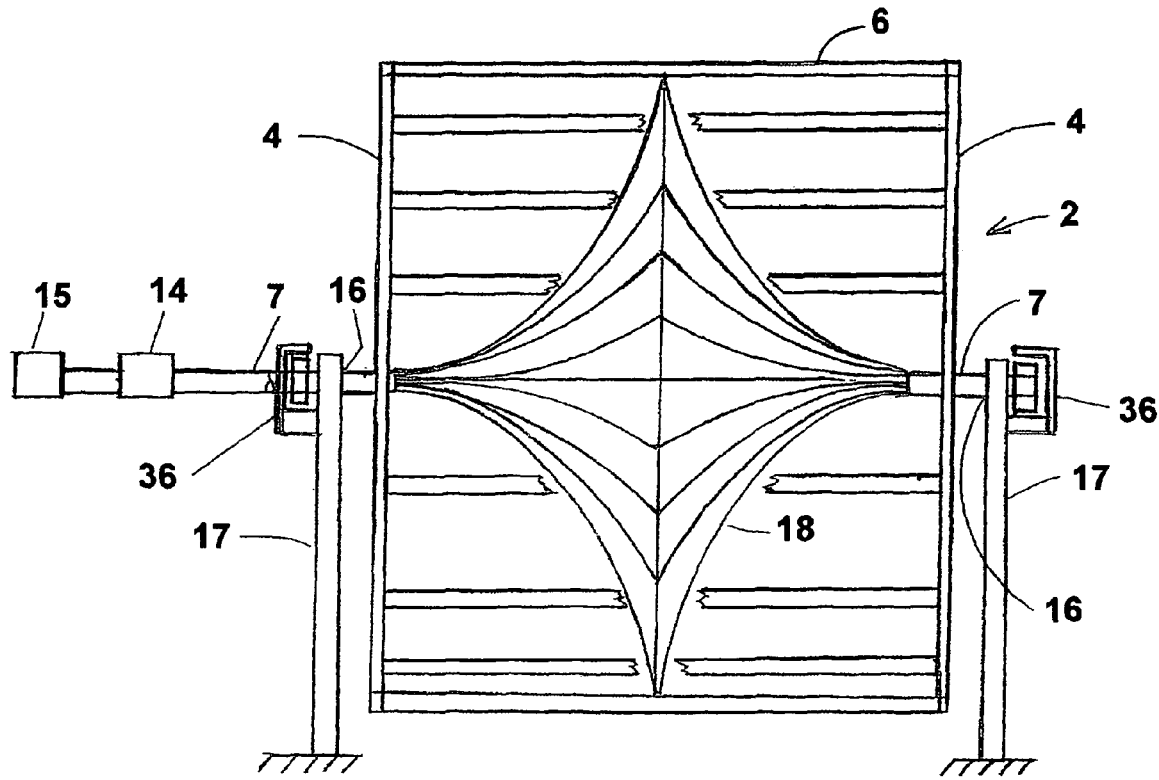
FIG. 6 shows a side view of the turbine rotor with a break away of the impulse blades to view the exhaust air deflector according to a preferred embodiment.

Referring to FIGS. 5, 6 and 6A, an exhaust deflector 18 is configured inside the cavity of the rotor 2 cylinder to receive the exhaust air 12 as it exits the impulse blades 6 and to deflect the exhaust air 12 axially toward the ends of the rotor 2 cylinder.

The exhaust deflector 18 is not shown in FIG. 5 for clarity but is shown in FIG. 6A and in a break away view on FIG. 6. The exhaust deflector 18 may be any shape but a tractricoid (pseudosphere) shape is preferred to provide a streamline escape for the exhaust air 12.

Referring to FIG. 5, the spokes 9 connect the rims 4 to the hubs 8 and transfer torque from the impulse blades 6 to the shaft 7. The spokes 9 may be any shape or size. The spokes 9 for this embodiment are configured with a flat surface on one side. The cross section of the spoke 9 is preferred to be a half moon shape with the straight side oriented to an angle of approximately 5 degrees to 45 degrees with respect to the rim 4 plane wherein the flat side leads and the leading edge, during rotor 2 rotation, is oriented toward the inside of the rotor 4. This configuration of the spokes 9 produces a fan action during rotor 2 rotation to aid removal of the exhaust air 12 from the rotor 2 cavity.

Referring now to FIGS. 1, 5 and 6, the shaft 7 extends on both ends of the rotor 2 through bearings 16 and bearing supports 17. The shaft 7 is also configured with a brake 36 on each end of the rotor 2. The brakes 36 are configured to stop the rotor 2 when the rotor 2 rpm exceeds a preset value or when the electrical current output of the generator 15 exceeds a preset value. The brakes 36 can also be manually actuated. The bearings 16, bearing supports 17, and the brakes 36 are omitted from FIG. 1 for clarity. On one end of the rotor 2, the shaft 7 is coupled to the input shaft of the gearbox 14. The output shaft of the gearbox 14 is coupled to the generator 15. The gearbox 14 has variable gear ratios such that the speed of the rotor 2 can be adjusted to gain the most efficient conversion of the wind energy. A gearbox 14 and a generator 15 combination may be configured on both ends of the rotor 2.

Referring to FIGS. 6 and 7, FIG. 7 shows a cross section of the impulse blade 6 (with a Crescent profile) and its relation to the shaft 7.

FIG. 7 includes a vector diagram with the following nomenclature.

$W_i$=the air 12 velocity entering the impulse blade 6
$W/B_i$=the air 12 velocity entering the impulse blade 6 with respect to the impulse blade 6
B =the impulse blade 6 velocity
$W/B_o$=the air 12 velocity leaving the impulse blade 6 with respect to the impulse blade 6
$W_o$=the air 12 veloci leaving the impulse (exhaust air 12 velocity)

The air 12 impinges on the concave surface of the impulse blade 6. The concave surface may be any curve shape but a circular arc 40 is preferred. The arc 40 radius is not limited but an arc 40 radius of approximately 4 inches is preferred for this embodiment. The maximum thickness of the impulse blade 6 cross section is not limited but a thickness of approximately $1/16^{th}$ to $3/4$ inch is preferred. The length of the impulse blades 6 which equals the length of the rotor 2 can be any length but a length of approximately $1/2$ the radius of the rim 4 is preferred. The shaft 7 size is not limited but a diameter of approximately 1 to 2 inches is preferred.

The ideal velocity relationships of FIG. 7 are used to determine the size relationships of the major components of this invention. The vector diagram shows the desired air 12 velocity $W_i$ and the blade 6 velocity B relationships necessary to obtain the maximum energy conversion from the wind. The air 12 velocity $W_i$ entering the impulse blade 6 multiplied times the cosine of the angle 38 equals 2 times the impulse blade 6 velocity B. The desired use of the generated power is to have the generator 15 synchronized with the public power grid at 60 cycles per second which means the generator must operate at a constant rpm. In order to achieve maximum energy conversion when wind speed changes, the rotor 2 rpm (directly proportional to the impulse blade 6 velocity B) must be changed. This is accomplished with the variable gear ratio gearbox 14. The air 12 velocity $W_i$ will be measured and used to adjust the speed ratio of the gear box 14. The speed ratio of the gear box 14 may be automatically or manually controlled with market available equipment. The angle 38 is chosen at 30 degrees such that $[W_i]=2[W_o]$. Let brackets indicate absolute value. Ideally the air 12 density is constant for flow through impulse blades 6. Therefore $[W_i]A_i=[W_o]A_o$ where $A_i$=total air 12 inlet area through the impulse blades 6 and $A_o$=the total air 12 exhaust area through the spokes 9 at the ends of the rotor 2. Further it can be calculated that a ratio of rim 4 radius to rotor 2 length=approximately 2. And it can be calculated that with an arc 40 radius of 4 inches and an angle 38 of 30 degrees that an arc 40 length (the impulse blade 6 cross section concave length) will be approximately 5.7 inches.

Referring now to FIGS. 6 and 7, the unique feature of the impulse blades 6 is that the air 12 velocity decreases when passing through the impulse blades 6, whereas the pressure remains constant. Energy is transferred by changing the velocity of the air 12 with no substantial change in its pressure. Using the ideal example of FIG. 7 the tangential component of the exhaust air 12 velocity $W_o$ is zero having converted substantially all of the available energy from the air 12 to the rotor 2 via the impulse blades 6. The exhaust air 12 velocity $W_o$ is radial and will be deflected to an axial direction by the exhaust deflector 18, wherein the exhaust air 12 flows toward the spokes 9 where the fan action of the spokes 9 aids removal of the exhaust air 12 from the rotor 2 cavity.

It is to be understood that the aforementioned description is illustrative only and that changes can be made in the machine, in size and proportions, and in the sequence of combinations and process steps, as well as in other aspects of the invention discussed herein, without departing from the scope of the invention as defined in the following claims.

I claim:

1. An impulse wind machine comprising:
   a turbine housing configured with an inlet to receive air and configured to direct the air in an inward spiral path to an outlet at an eye of the turbine housing, a plurality of directional vanes configured along the longitudinal periphery of the eye; and
   a cylindrical rotor comprising; a shaft; a plurality of impulse blades configured longitudinally along the cylindrical perimeter of the rotor and configured to rotate on a shaft within the eye of the turbine housing; the plurality of impulse blades connected at each end of the rotor to a rim; a plurality of spokes extending between each rim to a hub on the rotor shaft; and an exhaust deflector positioned around the shaft and between the hubs, wherein the air passes through the directional vanes, impinges the impulse blades and causes the rotor to rotate, after impinging the impulse blades, the air is redirected by the exhaust deflector to leave the turbine housing outlet through the ends of the cylindrical rotor.

2. The machine of claim 1, wherein a wind collection funnel comprising an air intake and an air exit with a decreasing cross section from the intake to the exit wherein the exit is coupled to the turbine housing inlet.

3. The machine of claim 1, wherein each impulse blade is configured with a crescent cross section.

4. The machine of claim 1, wherein the cross section of the impulse blade is concave on the air impingement side of the blade.

5. The machine of claim 1, wherein the cross section of each spoke is configured with a flat surface oriented at an angle of 5 to 45 degrees to the plane of the rim.

6. The machine of claim 1, wherein the turbine housing inlet is configured with a protective screen.

7. The machine of claim 1, wherein the angle of each directional vane is approximately 5 to 45 degrees with respect to a corresponding tangent on the circle of the eye.

8. The machine of claim 1, wherein the rotor shaft is supported by bearings and beating supports and is coupled to at least one adjustable gearbox.

9. The machine of claim 8, wherein at least one adjustable gearbox drives at least one generator for generating electrical power.

10. The machine of claim 1, wherein the turbine housing is configured with at least one wind diversion door that will open during storm conditions allowing air to escape to protect the machine from damage.

11. The machine of claim 1, wherein the rotor is configured with at least one brake to stop rotor rotation.

12. The machine of claim 11, comprising means for actuating at least one brake to protect the machine from over speed or electrical over current.

13. A method of operating the machine of claim 10, wherein during storm conditions, the at least one diversion door is opened and at least one brake is actuated.

14. The machine of claim 1, comprising a gearbox with variable gear ratios for adjusting the rotor rpm for maximum energy conversion.

* * * * *